Figure 1:
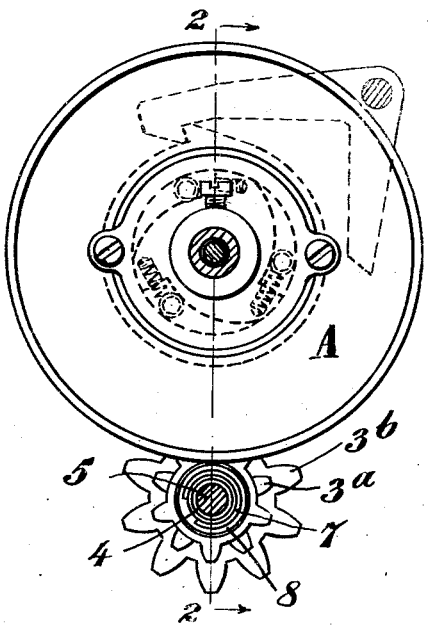

Dec. 26, 1939.  J. FRASER  2,184,420

TRANSFER MECHANISM FOR COUNTING AND COMPUTING MECHANISM

Filed July 2, 1938

Inventor:- John Fraser.
by Marshall & Marshall
Attorneys

Patented Dec. 26, 1939

2,184,420

UNITED STATES PATENT OFFICE 2,184,420

TRANSFER MECHANISM FOR COUNTING AND COMPUTING MECHANISM

John Fraser, Clerkenwell Green, London, England, assignor to Avery-Hardoll Limited, Clerkenwell Green, London, England Application July 2, 1938, Serial No. 217,248
In Great Britain July 15, 1937

5 Claims. (Cl. 74—411)

This invention has reference to improvements relating to transfer mechanism for counting and computing mechanisms and is concerned essentially with counting and computing mechanisms of the kind in which a unit of higher denomination is driven from the preceding unit of lower denomination through interrupted toothed gearing.

With counting and computing mechanisms of the aforesaid kind it will be appreciated that an impact occurs whenever the interrupted teeth come into contact with the teeth of the intermediate driving pinion, which results in a tendency to force the immediate pinion bodily away from the interrupted teeth, and that in the case of counting and computing mechanisms which may be required to operate at a high speed this impact assumes relatively serious proportions and may result in damage to the mechanism.

The present invention has for its object the provision of an improved means for absorbing the impact shock to the intermediate driving pinion or pinions of counting or computing mechanisms of the aforesaid kind.

The invention consists of an improved transfer mechanism for counting or computing mechanism of the kind hereinbefore referred to which is characterised in that an intermediate pinion is movably mounted relatively to a rotatable carrier member and in that the movement of the intermediate pinion away from the interrupted teeth which tends to occur at the moment of impact between the interrupted teeth and the teeth of the intermediate pinion is resisted by means which by virtue of its resistance to such movement of the intermediate pinion serves to damp or absorb any shock received by the intermediate pinion due to impact.

The invention also resides in an improved transfer mechanism for counting or computing mechanism of the kind hereinbefore referred to wherein an intermediate driving pinion is movably mounted relatively to a carrier member in the form of a rotatably mounted sleeve and wherein the said pinion is maintained normally in frictional contact with the sleeve by an axially displaceable member the displacement of which is resisted by a motion damping means so that the displacement of the intermediate pinion which is occasioned as a consequence of the impact of the interrupted teeth with the teeth of the intermediate pinion when the drive is taken up, is caused to effect displacement of the aforesaid axially displaceable member against the resistance of the motion damping means and thereby to enable the shock of the impact to be absorbed or damped by the aforesaid motion damping means in conjunction with the resistance to the movement of the intermediate pinion occasioned by the frictional pressure between the intermediate pinion and the sleeve.

The invention further resides in the details of construction of the improved shock absorbing or shock damping means for use in conjunction with the intermediate driving pinions of counting and computing mechanisms of the interrupted toothed gear type which is described hereinafter.

A convenient embodiment of the invention will now be described with particular reference to the accompanying sheet of drawings which illustrate the invention in its application to a counting mechanism of the interrupted toothed gear type which is particularly adapted for meter pumps for measuring and dispensing liquid fuel and which are required to run at a relatively high rate, and which incorporates the mechanisms described and illustrated in the specifications of my United States patent applications Serial Nos. 150,634 and 150,635.

Figure 2:
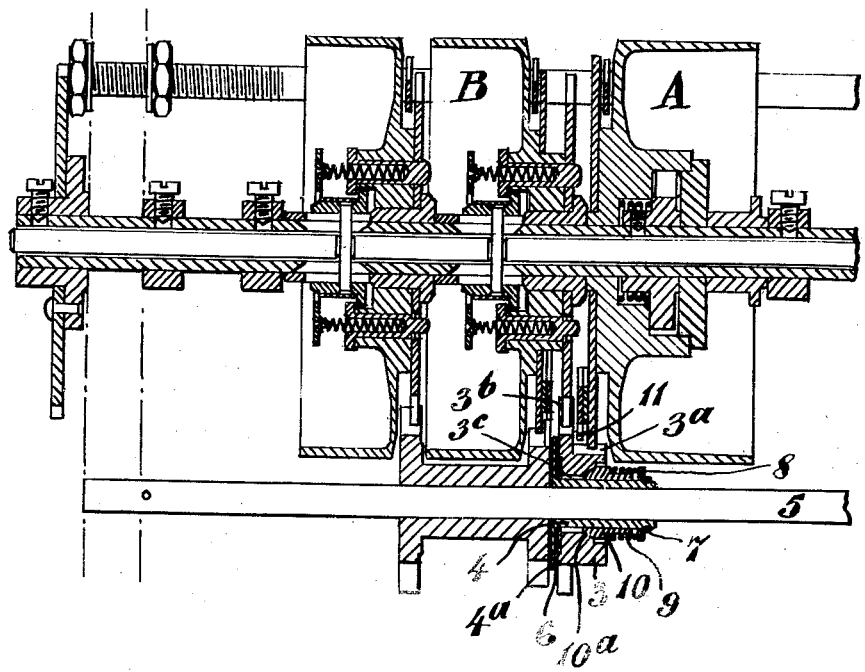

In the drawing:

Figure 1 is an end elevation of sufficient of the improved counting mechanism as is necessary to an understanding of the invention, and Figure 2 is a longitudinal vertical section taken on the plane indicated by the line 2—2 Figure 1 looking in the direction of the arrows to said line.

According to the said illustrated embodiment of the invention the intermediate driving pinion between the pence drum A and the shillings drum B is in the form of an annulus 3 provided with two sets of teeth $3^a$ $3^b$, said annulus 3 being disposed around a carrier member in the form of a sleeve 4 which is freely mounted on the dead axle 5 upon which all the intermediate driving pinions are required to rotate. This sleeve 4 is formed at one end with a vertically disposed flange $4^a$ one face of which is in abutment with one face of a friction washer 6 the other face of which abuts the adjacent face of the annular pinion 3. Adjacent to its other end the sleeve 4 is provided with a groove within which is located a spring ring 7 said spring ring 7 serving to hold in position a washer 8 which serves as an abutment for one end of a coil spring 9 which is arranged concentrically about the sleeve 4 and the other end of which abuts a shoulder on a collar 10 freely mounted on the sleeve. The aforesaid collar 10 is formed at one end with frusto-conical portion $10^a$ which co-operates with the rim bounding the adjacent end of the hole $3^c$ in the annular pinion 3.

It should be pointed out that the hole 3ᶜ in the annular pinion 3 is of a greater diameter than the external diameter of the sleeve 4, and that the aforesaid spring 9 thrusts on the collar 10 and so forces the annular pinion 3 normally into binding frictional contact with the friction washer 6 on the sleeve 4.

Whenever the interrupted teeth 11 come into driving contact with the teeth 3ᵃ of the intermediate driving pinion 3 the resultant impact causes a bodily downward displacement of the pinion 3 away from the interrupted teeth 11 which necessarily results in a displacement of the collar 10 on the sleeve 4 away from the intermediate pinion 3 against the resistance of the spring 9, because of the frusto-conical shape of the portion 10ᵃ of the collar 10. The displacement of the collar 10 thus occasioned results in the shock transmitted to the driving pinion 3 being absorbed or damped by the coil spring 9 in conjunction with the resistance to movement of the intermediate pinion occasioned by the frictional pressure between the pinion 3 and the friction washer 6 thus preventing the damage or undue wear to the mechanism as a whole as may obtain in the case of the prior mechanisms heretofore in use.

Upon its return movement the collar 10 serves to centralise the pinion 3 relatively to the sleeve 4 but this return movement is necessarily damped by the friction obtaining between the contacting faces of the pinion 3 and the friction washer 6.

It will be appreciated that although the invention has been described in its application to a counting mechanism for use with meter pumps the invention is equally applicable to counting mechanism having transfer mechanism of the interrupted tooth type generally and to counting mechanisms of the same kind which are employed for other purposes in which the possibility of damage to the mechanism due to impact when running at high speed is present.

I claim:

1. A transfer mechanism for counting and computing mechanism comprising an interrupted toothed driving member, an intermediate toothed member that is actuated by said driving member and is mounted to move bodily away from the teeth of said driving member in response to the impact of said teeth, resilient means for resisting said bodily movement to absorb the shock of said impact, and a toothed driven member actuated by said intermediate member.

2. A transfer mechanism for counting and computing mechanism comprising an interrupted toothed driving member, a rotatable carrier, an intermediate toothed member that is actuated by said driving member and is mounted on said carrier to move bodily away from the teeth of said driving member in response to the impact of said teeth, means on said carrier for maintaining frictional engagement with said intermediate member during its bodily movement, resilient means for resisting said bodily movement to act in conjunction with said frictional engagement to absorb the shock of said impact, and a toothed driven member actuated by said intermediate member.

3. A transfer mechanism for counting and computing mechanism comprising an interrupted toothed driving member, a carrier rotatable on an axle, an intermediate toothed member that is actuated by said driving member and is mounted on said carrier to move bodily away from the teeth of said driving member in response to the impact of said teeth, a collar axially slidable inward on said carrier for centering said intermediate member about said axle, resilient means for resisting axial outward movement of said collar and thereby opposing said bodily movement to absorb the shock of said impact, whereby the intermediate member is recentered after such movement, and a toothed driven member actuated by said intermediate member.

4. A transfer mechanism according to claim 3, wherein the carrier has a flange for maintaining frictional engagement with the intermediate member during its bodily movement.

5. A transfer mechanism for counting and computing mechanism comprising an interrupted toothed driving pinion, a carrier rotatable on an axle, an intermediate pinion having two sets of teeth, one of which is engageable with said driving pinion, said intermediate pinion being mounted on said carrier to move bodily away from the teeth of said driving pinion in response to the impact of said teeth, means on said carrier for maintaining frictional engagement with said intermediate pinion during its bodily movement, a collar axially slidable inward on said carrier for centering said intermediate pinion about said axle, resilient means for resisting axial outward movement of said collar and thereby opposing said bodily movement to act in conjunction with said frictional engagement to absorb the shock of said impact, and a driven pinion meshing with the other set of teeth on the intermediate pinion.

J. FRASER.